United States Patent
Yang et al.

(10) Patent No.: US 9,400,181 B2
(45) Date of Patent: Jul. 26, 2016

(54) SYSTEMS AND METHODS FOR DETECTION OF MAGNETIC AND MOTION-BASED LANDMARKS

(71) Applicant: INTEL CORPORATION, Santa Clara, CA (US)

(72) Inventors: Xue Yang, Arcadia, CA (US); Yang Lei, Hillsboro, OR (US); Aveek Purohit, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 14/128,164

(22) PCT Filed: Jun. 27, 2013

(86) PCT No.: PCT/US2013/048325
§ 371 (c)(1),
(2) Date: Dec. 20, 2013

(87) PCT Pub. No.: WO2014/209331
PCT Pub. Date: Dec. 31, 2014

(65) Prior Publication Data
US 2015/0219461 A1    Aug. 6, 2015

(51) Int. Cl.
| | |
|---|---|
| *G01V 3/38* | (2006.01) |
| *G01C 21/04* | (2006.01) |
| *G01S 5/02* | (2010.01) |
| *G01C 21/20* | (2006.01) |
| *G06F 11/30* | (2006.01) |

(52) U.S. Cl.
CPC ............... *G01C 21/04* (2013.01); *G01C 21/20* (2013.01); *G01S 5/0252* (2013.01)

(58) Field of Classification Search
CPC ...................................................... G01C 21/04
See application file for complete search history.

(56) References Cited

U.S. PATENT DOCUMENTS

| | | |
|---|---|---|
| 2006/0123014 A1 | 6/2006 | Ng |
| 2008/0288165 A1 | 11/2008 | Suomela et al. |
| 2010/0268465 A1 | 10/2010 | Hegde |
| 2011/0208425 A1 | 8/2011 | Zheng et al. |

(Continued)

FOREIGN PATENT DOCUMENTS

WO    2014/209331 A1    12/2014

OTHER PUBLICATIONS

International Preliminary Report on Patentability and Written Opinion received for PCT Patent Application No. PCT/US2013/048325, mailed on Jan. 7, 2016, 9 pages.

(Continued)

*Primary Examiner* — Phuong Huynh
(74) *Attorney, Agent, or Firm* — Salehi Law Group

(57) ABSTRACT

A method of determining landmarks includes receiving, at a computing system, a plurality of potential landmark measurements and corresponding signal measurements. The method further includes determining, at the computing system, a plurality of landmark candidates from the plurality of potential landmark candidates and corresponding signal measurements. The method further includes determining a normalized signal distance between a first signal measurement corresponding to a first landmark candidate of the plurality of landmark candidates and a second signal measurement corresponding to a second landmark candidate of the plurality of landmark candidates. The method further includes determining, at the computing system, that the first landmark corresponds to the second landmark based on the normalized signal distance.

25 Claims, 8 Drawing Sheets

(56) References Cited

U.S. PATENT DOCUMENTS

2012/0313777 A1* 12/2012 Zazula ................ G06Q 10/109
                                                  340/539.13
2013/0244692 A1*  9/2013 Kelly ...................... H04W 4/02
                                                   455/456.1

OTHER PUBLICATIONS

International Search Report and Written Opinion received for Patent Application No. PCT/US2013/048325, mailed on Mar. 21, 2014, 12 pages.

* cited by examiner

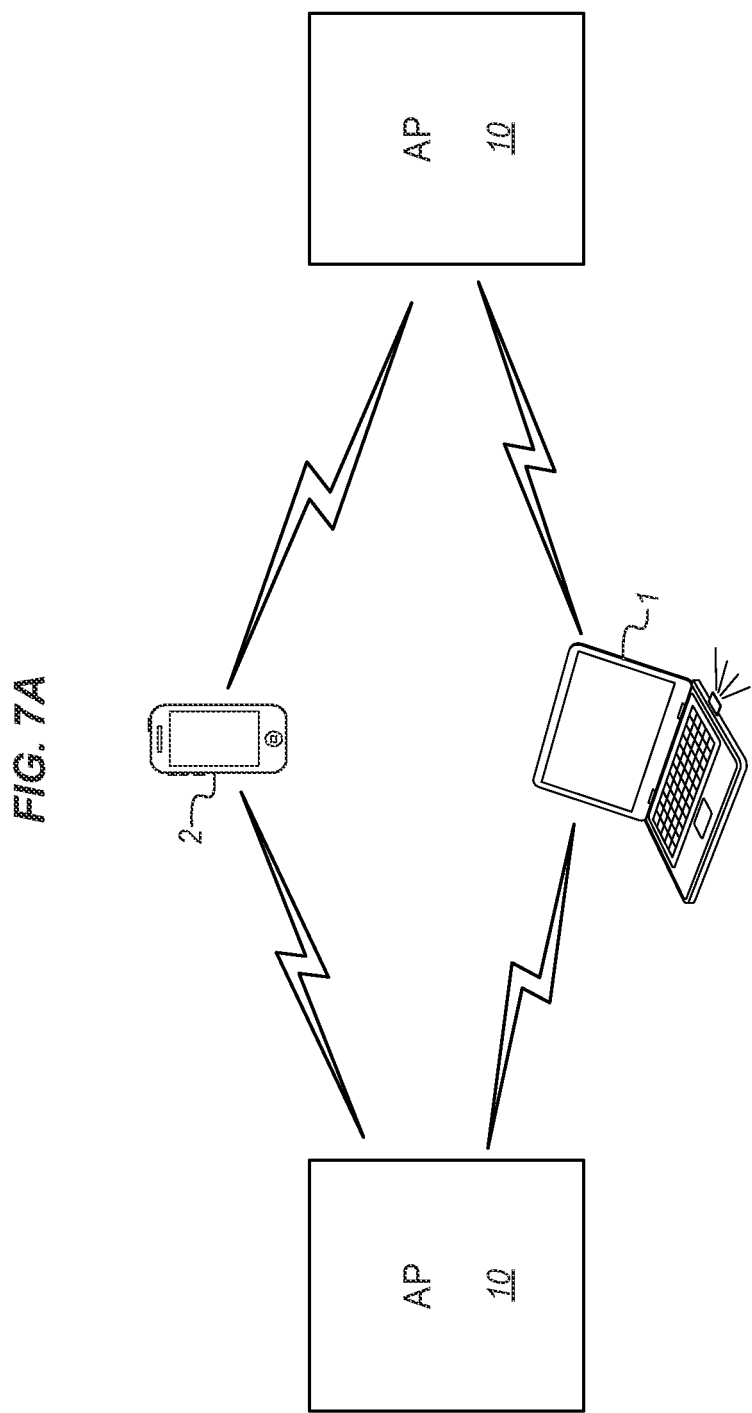

SYSTEMS AND METHODS FOR DETECTION OF MAGNETIC AND MOTION-BASED LANDMARKS

TECHNICAL FIELD

Embodiments described herein generally relate to the detection of landmarks in an environment using portable electronic devices.

BACKGROUND

Deriving accurate indoor location has been an increasingly important topic in the midst of a bloom of mobile applications utilizing such locations. Despite a decade of research and development efforts, the determination of indoor location remains challenging. GPS positioning generally is not available indoors due to poor reception of signals. Therefore, an alternative system is needed for determining mobile device position. One aspect of determining mobile device position includes the determination of landmarks.

BRIEF DESCRIPTION OF THE DRAWINGS

FIG. 7a shows an example of an environment in which embodiments of systems and methods for Detection Of Magnetic And Motion-Based Landmarks may be implemented.

DETAILED DESCRIPTION OF THE DRAWINGS

Described herein are embodiments of systems and methods for Detection Of Magnetic And Motion-Based Landmarks.

WiFi-based indoor location has been a popular area of research, due to a pre-existing ubiquitous infrastructure of WLAN access points in many indoor environments. However, one of the most popular methods—"WiFi fingerprinting"—requires pre-storing calibrated WiFi measurement data so that the locations can be determined through "WiFi fingerprint" matching (companies using this approach include Ekahau, Qubulus, SenionLab, WiFiSLAM, etc.). The pre-storing typically requires an extensive initial deployment effort/cost to correlate locations at a dense location granularity with corresponding WiFi RSSI measurements and observable APs (Access Points). This has prevented widespread adoption of this technology.

To reduce the deployment cost of "WiFi fingerprinting" while maintaining good location accuracy. Simultaneous Localization and Mapping (SLAM) approaches may be used to integrate the Inertial Navigation System (INS) with WiFi. The objective may be to automatically build a "WiFi fingerprint map" at dense location granularity without a human intervening.

In this context, one of the key problems may be to identify a set of unique virtual landmark features within the environment using MEMs sensors (i.e., magnetometer, gyroscope, accelerometer) and WiFi radio available on consumer mobile devices. In particular, the detection of two types of virtual landmarks may be determined, including the "magnetic field distortion" landmark and the "path intersection" landmark. For example, when a user repeatedly makes turns at one point, that point may be identified as a path "intersection" landmark. Also, when a user passes a heavy metal door, the substantial magnetic distortion can be consistently observed and the existence of the heavy metal door thus can be identified. Experimental results show that systems and methods for Detection Of Magnetic And Motion-Based Landmarks are reliable and robust, and can identify landmarks with high spatial precision. Accurately identified virtual landmarks may serve as critical input to SLAM algorithms for trajectory optimization.

Compared with existing landmark detection mechanisms using visual sensors (i.e., cameras) and/or laser range sensors, systems and methods for Detection Of Magnetic And Motion-Based Landmarks enable landmark detection using cheaper sensors available on consumer mobile devices (i.e., MEMs sensors and WiFi radio) and systems and methods for Detection Of Magnetic And Motion-Based Landmarks require much less computation and processing.

Problem Illustration

Figure 1:
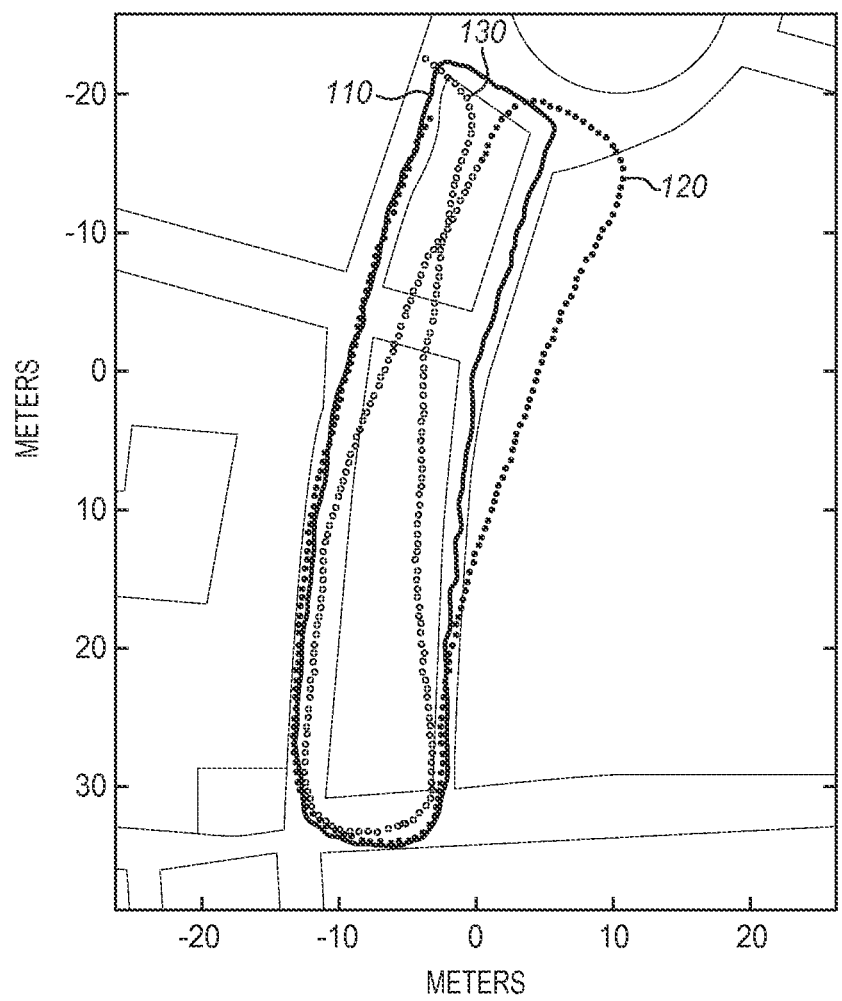
FIG. 1 shows an example of position data collected on a path walked by a user.

Consider the example in FIG. 1. A user walks around in a shopping mall carrying his/her mobile device along the trajectory 110. Mobile devices may include smartphones, tablets, laptops, Ultrabooks™, or other portable devices. These devices typically include a sensor array and antenna system. The sensor array includes various MEMs type sensors, and the antenna system may include a multiuse antenna or multiple antennas for various RF transmissions, such as WiFi, Bluetooth, as well as mobile phone transmission frequencies/protocols such as 3G, 4G, CDMA, etc. The actual computing performed according to the systems and methods described may be performed locally or at a remote server or cloud computing resource. Additionally, combinations of hardware, software, and firmware can be used, either in combination or by themselves to perform the computing.

Each dot in FIG. 1 indicates an estimated position (from inertial sensor dead reckoning) where a MEMs sensor measurement may be made. The closed dots 120 are estimated measurement positions when the user walks along the trajectory for the first time, while open dots 130 are estimated measurement positions when the user walks along the second trajectory for the second time. One goal may be to identify a set of unique "magnetic field distortion" landmarks and "path intersection" landmarks using MEMs sensor measurements and WiFi radio measurements collected along the user's walking trajectory.

Detection of "Magnetic Field Distortion" Landmark

The earth acts as a big spherical magnet creating a geomagnetic field around it. At any point on the earth's surface, the intensity and direction of the magnetic field can be measured. Instruments, such as the magnetic compass, that measure the direction of the horizontal component of the earth's magnetic field have been used for navigation in outdoor environments for centuries. However, in indoor environments, the geo-magnetic field is distorted significantly due to hard-iron (constant additive magnetic field) and soft-iron (nonadditive distortion of geo-magnetic field) materials in buildings. While this distorted field renders the heading direction estimation from a magnetometer useless, the distortions in the magnetic field can be used to uniquely identify certain locations, as employed in this invention.

Figure 2:
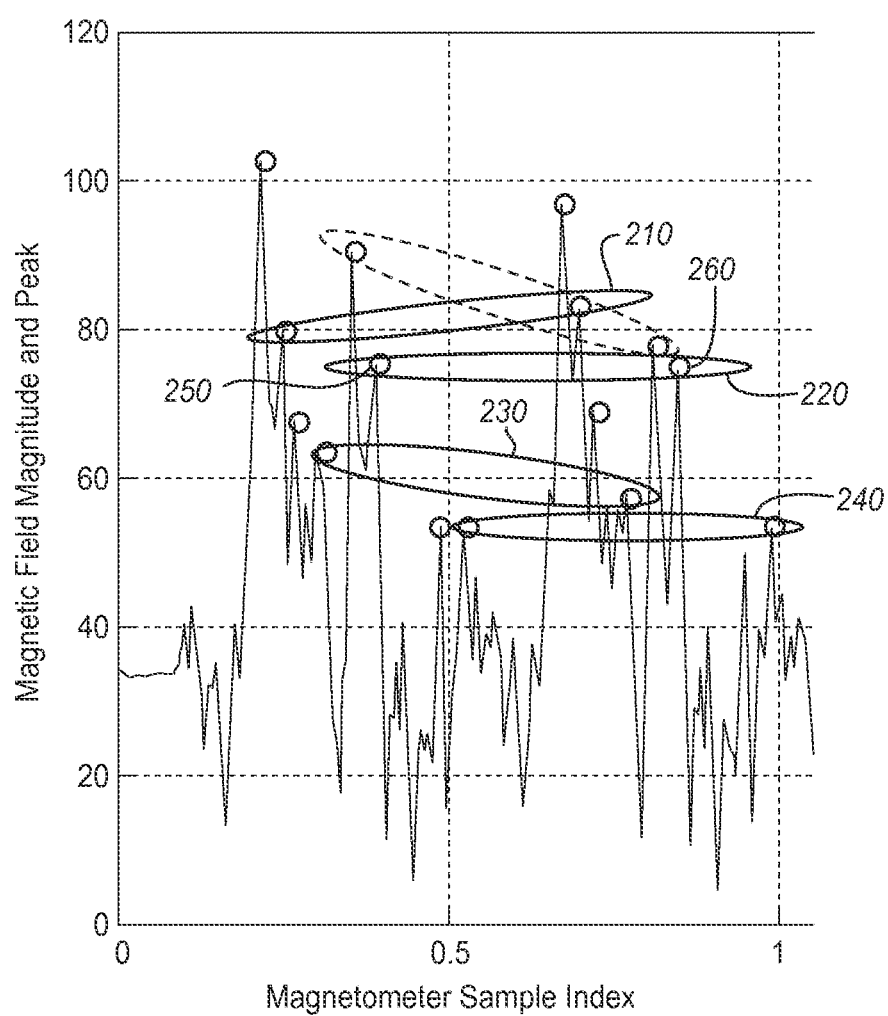
FIG. 2 shows an example of magnetic field readings collected along the two-loop trajectory shown in FIG. 1.

It is observed that many indoor structures such as metallic doorways, elevators, beams, and power-lines create a significant local distortion to the magnetic field. In particular, the magnitude of the magnetic field near the distortion source can be substantially higher than that of other places. Based on this observation, an embodiment of a method for detecting "magnetic field distortion" landmarks may be done as follows:

1. Given a continuous trace of magnetometer magnitude measurements obtained along a user's trajectory, points with local maxima of magnetic magnitude may be identified as the candidate magnetic field distortion landmarks. The idea is that, as the user walks, the magnetic magnitude will increase as the user approaches the distortion field (e.g., heavy metal door) and then will decrease as the user moves away from the distortion field. Therefore, the local maximal of die magnetic magnitude may indicate the existence of a magnetic field distortion landmark. The curve in FIG. 2 shows the magnitude of a magnetic field along the two-loop trajectory shown in FIG. 1. As we can see, the magnetic field shows a repetitive pattern, and several magnetic field peak points (the circles) are identified, which serve as the candidates of the "magnetic field distortion" landmarks.

2. While a magnetic field peak determines the existence of a distorting landmark, it does not provide information on which distorting landmark it is. In order to identify the uniqueness of the landmark, WiFi signal strength measurements (a vector of RSS from multiple WLAN access points) may be used to address this issue. The corresponding WiFi measurements (closest in time) to the candidate landmarks may be obtained, and then the normalized WiFi distance may be used to identify identical landmarks. The idea is that if the two candidate landmarks are the identical ones, the WiFi measurements the system observes at those two landmarks should be very similar. On the other hand, if the two candidate landmarks are different, they usually are separated in distance from each other and the corresponding WiFi measurements should be different.

3. If the Normalized WiFi distance (instead of absolute WiFi distance) between the candidate landmarks "i" and "j" is below a WiFi_landmark_threshold, then candidate landmarks "i" and "j" may be considered identical landmarks. More specifically, let $V_i$ be the WiFi RSSI vector at candidate landmark "i" and $V_j$ be the WiFi RSSI vector at candidate landmark "j"; and let K be the number of common APs in $V_i$ and $V_j$. The normalized WiFi distance may be calculated as:

$$D_j^i = \frac{\|V_i - V_j\|}{Pow\left(K, \frac{1}{p}\right)} \quad \text{Eq. (1)}$$

Figure 3:
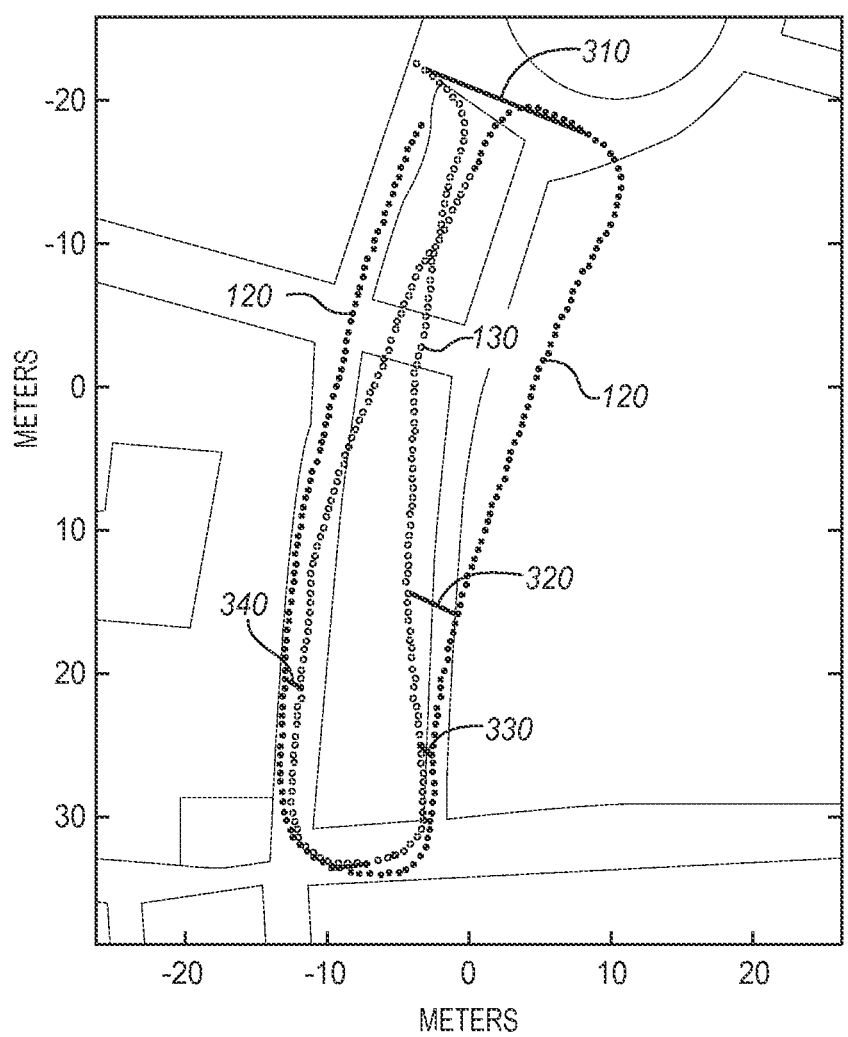
FIG. 3 shows an example of five unique "magnetic field distortion" landmarks identified using one embodiment of a method for the two-loop trajectory shown in FIG. 1.

FIG. 3 shows five unique "magnetic field distortion" landmarks identified using an embodiment of a method for the two-loop trajectory shown in FIG. 1. Each line 320 in FIG. 3 connects two candidate landmarks that are recognized as identical, which correspond to five pairs of magnetic peaks shown in FIG. 2.

Figure 4:
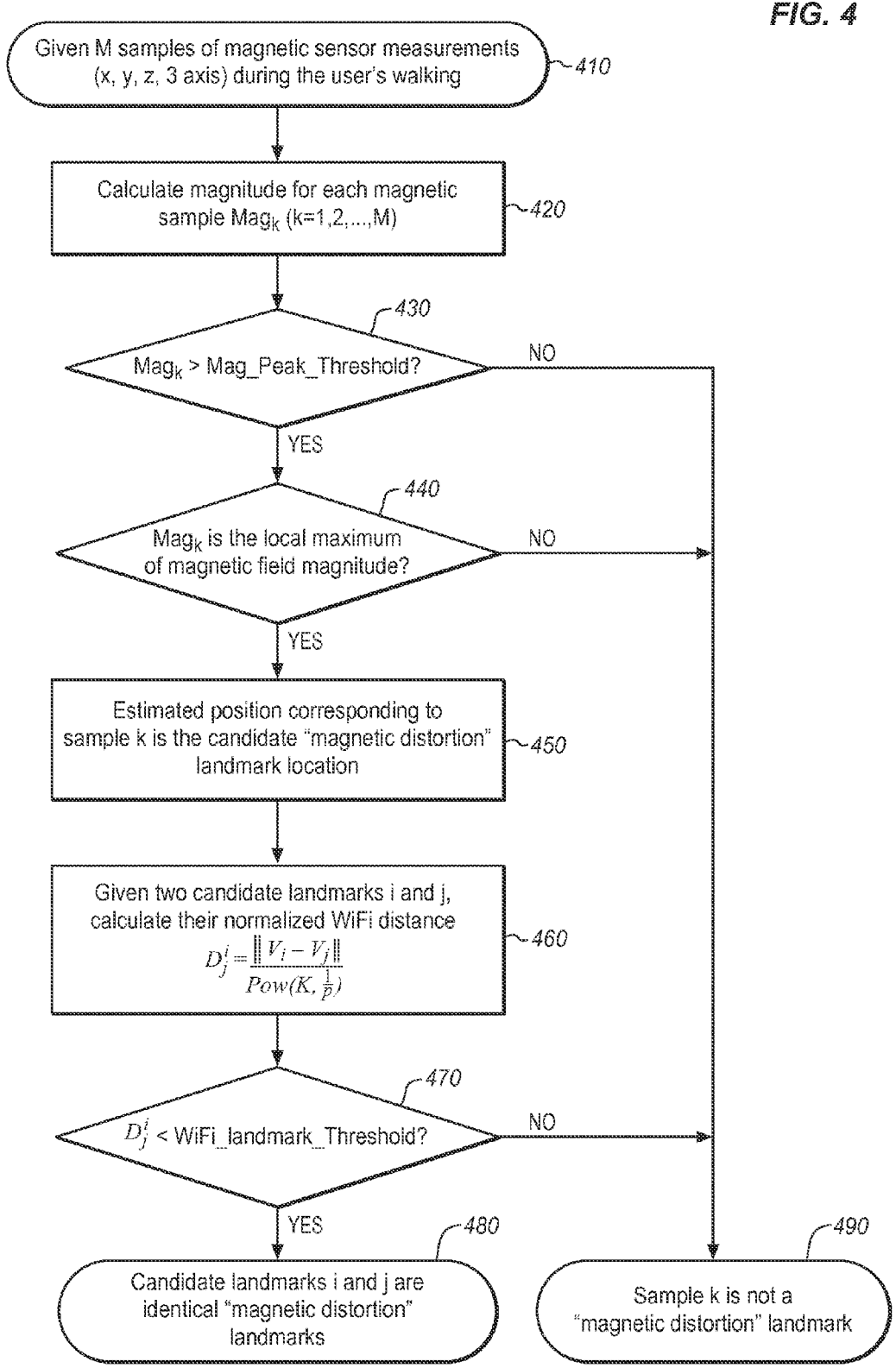
FIG. 4 shows one embodiment of a flow diagram of a method for the detection of a "magnetic field distortion" landmark.

FIG. 4 shows the flow diagram of a method for the detection of a "magnetic field distortion" landmark. In block 410, the method starts with multiple samples of magnetic field measurements during the travel of an electronic device carried by a user. In block 420, the magnitude is calculated for each sample based on the three sensor measurements. In block 430, it may be determined whether the magnitude is over a threshold. If yes, then in block 440, it is determined whether the magnitude at a particular point is a local maximum by comparing it to nearby magnitudes. If not, then the point may not be a landmark. If yes, then in block 450, it is determined the position is a landmark location. If not, then the point may not be a landmark. In block 460, the normalized WiFi distance is calculated between two points determined to be landmark locations. If the normalized WiFi distance is less than a threshold, then it is determined that the points are the same landmark. If not, in block 490, it is determined that the points are not the same landmark.

Detection of "Path Intersection" Landmark

Path intersections may be useful landmarks that not only can help SLAM trajectory optimization, they can also be used to better align user trajectories with floor plans to further improve localization estimates. Path intersections are detected based on the changes of user heading directions. When a user repeatedly makes turns at one point, it can be identified that point is a path "intersection" landmark. The user heading directions can be derived either from a gyroscope or magnetometer together with an accelerometer. A method for detecting "path intersection" landmarks may be done as follows:

1. The mobile device heading direction may be derived either from a gyroscope or magnetometer together with an accelerometer using a conventional method.

2. In the second, a turn detection algorithm may be used to detect the turning points from heading directions. The turn detection algorithm seeks to filter out local anomalies/variations in heading direction and identify consistent changes in direction.

The turn detection algorithm may have the following passes:

a) In the first pass, candidate turn points may be determined by comparing the angular change of heading directions in consecutive samples. If the angular change exceeds a threshold (turn_threshold), the point may be marked as a potential turning point.

b) In the second pass, candidate turn points may be filtered out that are likely to be distortions and abnormal variations rather than actual changes in directions. This may be achieved by computing the modal direction over a window (the size of the window is determined by a parameter (turn_window_size)) before and after the candidate turn point. If the change in the modal direction exceeds a threshold (window_turn_threshold), the point may be identified as a turn; otherwise, the candidate is discarded.

The turn detection algorithm described above may determine the point of a turn while avoiding the smoothing effect of filtering.

Note that even though the absolute heading direction from a magnetometer can be wrong due to the presence of indoor magnetic distortions, the relative direction change from a magnetometer heading may still indicate the turns made by the user.

3. While a turn point determines the existence of a "path intersection" landmark, it does not provide information on which intersection it is. In order to identify the uniqueness of the "path intersection" landmark, WiFi signal strength measurements (a vector of RSS from multiple WLAN access points) may be used to address this issue. The corresponding WiFi measurements (closest in time) to the candidate turn points may be used, and then normalized WiFi distance may be used to identify identical turn points. The idea is that if the two candidate turn points are the identical ones, the WiFi measurements the user observes at those two points should be very similar. On the other hand, if the two candidate turn points are different, they usually are separated in distance from each other, and the corresponding WiFi measurements should be different.

4. If the Normalized WiFi distance (defined in Eq. (1)) between the candidate turn points "i" and "j" is below a certain threshold, it may be determined that candidate landmarks "i" and "j" are the identical landmarks.

Figure 5:
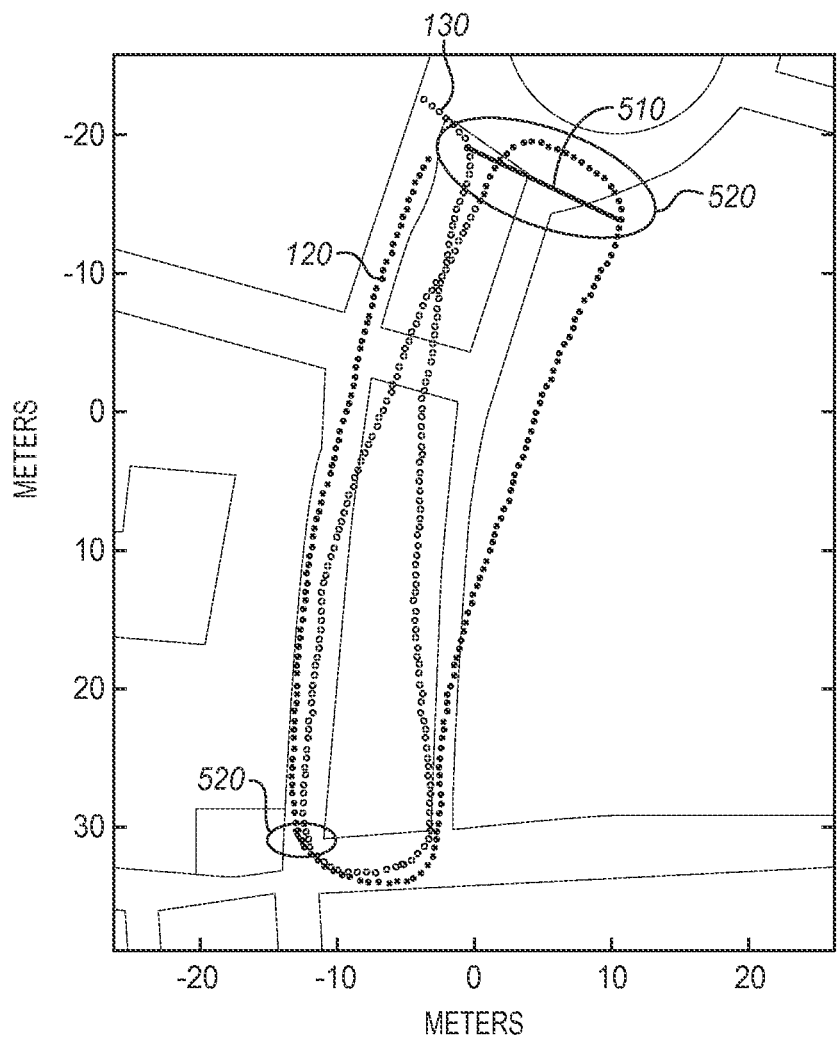
FIG. 5 shows an example of two "path intersection" landmarks identified using methods for Magnetic and Motion-Based Landmarks.

FIG. 5 shows two "path intersection" landmarks 520 identified using one embodiment of a method, where line 510 connects two candidate landmarks that are recognized as identical.

Figure 6:
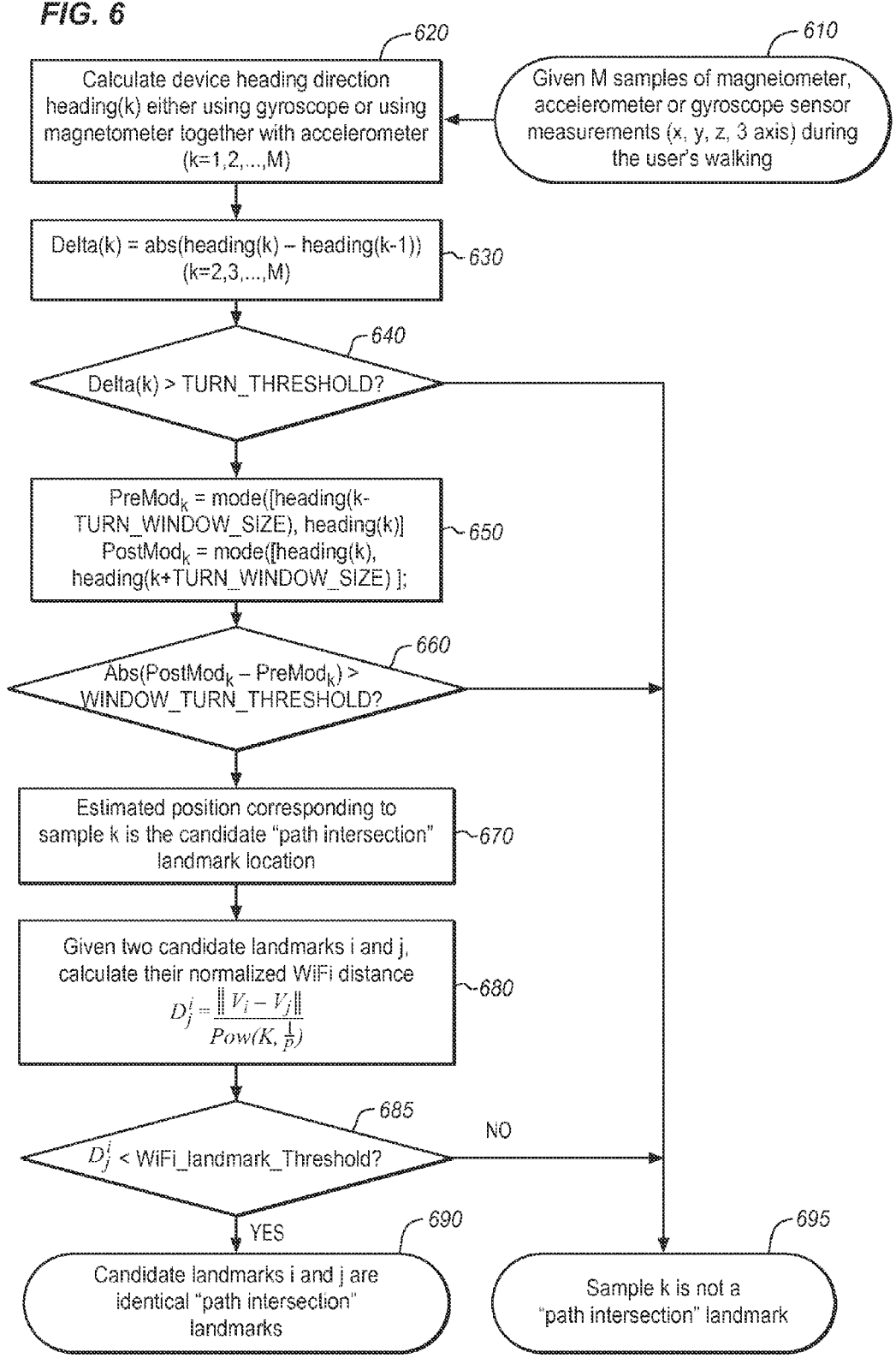
FIG. 6 shows one embodiment of a flow diagram of a method for the detection of "path intersection" landmarks.

FIG. 6 shows a flow diagram of a method for the detection of "path intersection" landmarks. In block 610, position and turn data from a combination of sensors such as a magnetometer, accelerometer, or gyroscope sensor are provided. In block 620, the device heading is calculated using the gyroscope or magnetometer in combination with the accelerometer to determine a heading. In block 630, the Delta(k) or change in heading is calculated by taking the absolute value of the current heading minus the previous heading. If the change in heading for a particular point is greater than the turn threshold, then in block 640, the point may be a turn. In block 650, it is determined whether the heading before and after the turn point is consistent. This helps determine whether the turn was an actual turning point or merely an anomaly, where the position of the device was changed due to non-turning movements of the user. The mode or value for the heading that occurs most often before the turn is determined, and the mode for the heading after the turn is determined. This mode is for a certain window of time or distance, or other variable, before and after the turn. In block 660, it is determined whether the absolute value of the modal direction after the turn minus the modal direction before the turn is greater than a window turn threshold. If the turn point is above the turn threshold and the turn point has a modal turn value for a window before and after the turn point above a window turn threshold, then the candidate is a path intersection or turn point. In block 670, the point may be determined to be a turn point or path intersection.

In block 680, the WiFi distance between two turn points or path intersections may be calculated. In block 685, if it is less than a WiFi landmark threshold, then the points may be determined to be the same path intersection or turn point in block 690. In block 695, if they fail the criteria, then the point is not a path intersection or turn point landmark.

Figure 7B:
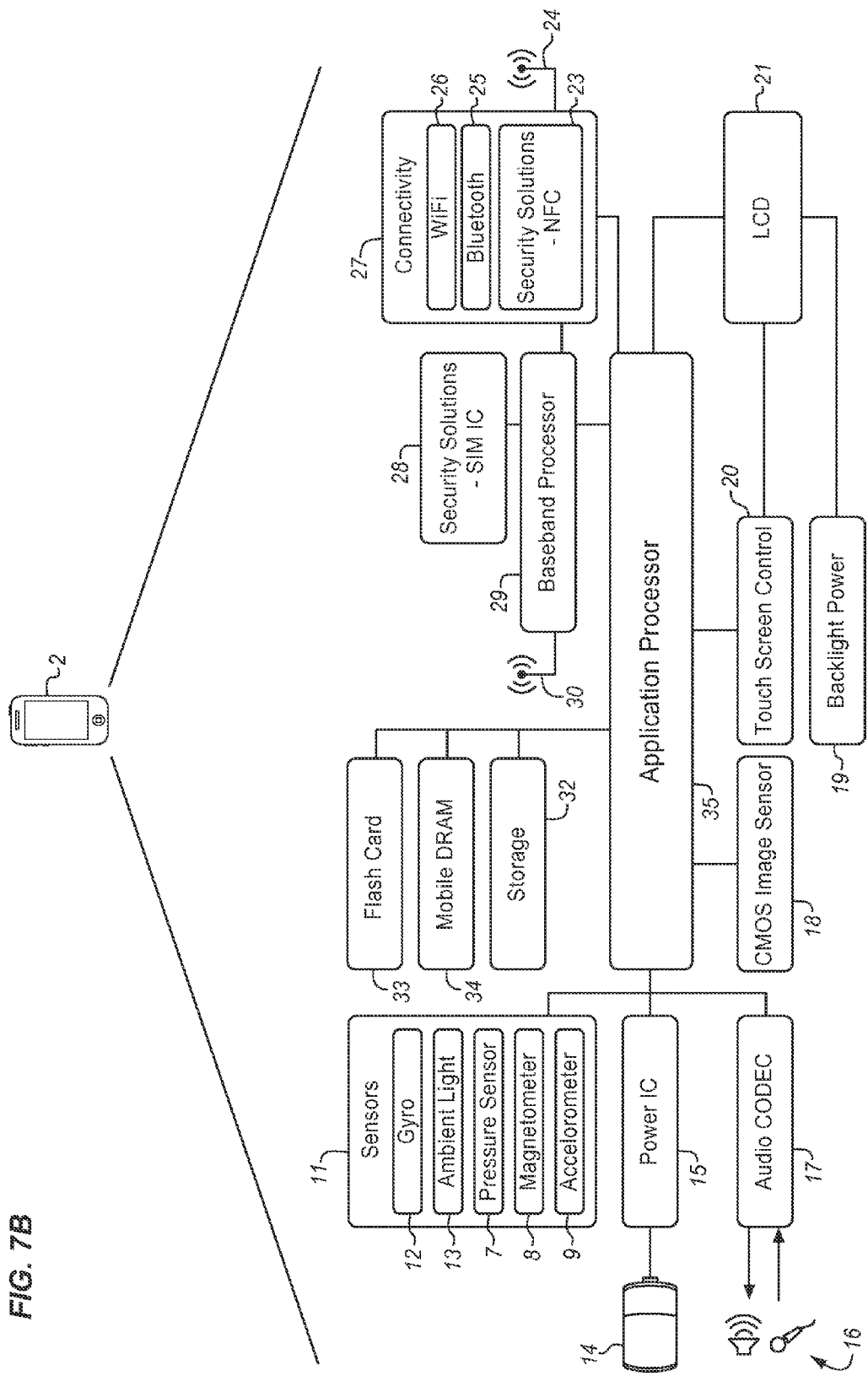
FIG. 7b shows an example of a smart phone that may be used in conjunction with embodiments of systems and methods for Detection Of Magnetic And Motion-Based Landmarks.

FIGS. 7a and 7b show an example of an environment in which embodiments of systems and methods for Detection Of Magnetic And Motion-Based Landmarks may be implemented. In many implementation, a user may move around an area with a computer 1, smart phone 2, or other computing device. Sensors in the computer 1, smart phone 2, or other computing device may collect data from the environment as well as radio signals from access points 10. Embodiments of systems and methods for Detection Of Magnetic And Motion-Based Landmarks may be designed to function with off the shelf computing devices such as smart phones. An exemplary smart phone 2 is shown in FIG. 7b. The lines connecting modules or pans of the smart phone indicate one or two way communication; however, the pieces may be configured and may communicate differently in alternatives.

The smart phone may include sensors 11 that communicate with the application processor 35. Sensors may include a gyroscopic sensor 12, an ambient light sensor 13, a pressure sensor 7 (for detecting atmospheric pressure), a magnetometer 8, and accelerometer 9. The smart phone 2 may further include battery 14 and power management integrated circuit 15. The smart phone 2 may further include a speaker and microphone 16 and an audio codec 17 for encoding audio. The smart phone 2 may further include a CMOS image sensor 18 that may find use in a camera. The smart phone 2 may further include a touch screen control 20 that is configured to interact with a LCD 21 that may have a backlight power module 19. The smart phone 2 may further include wireless radio modules includes connectivity modules 27. Connectivity modules 27 include modules for WiFi 26, Bluetooth 25, and Near Field Communication (including security solutions) 23. These systems may use common antenna 24, however in alternatives, different antennas may be utilized. Smart phone 2 may also include SIM card security systems 28 and a baseband processor 29 that communicates with antenna 30 for communicating via typical mobile phone frequencies, such as CDMA, 3GPP, 4GPP, etc. Smart phone 2 may also include memory systems such a flash card 33, mobile DRAM 34, and other types of storage 32. All of these systems may communicate with application processor 35 in order to implement the systems and methods for Detection Of Magnetic And Motion-Based Landmarks as well as other typical smart phone activities. A custom device may be created that eliminates some of these components, such as Bluetooth module 25, NFC modules 23, CMOS image sensor 18, microphone and speaker 16 and associated audio CODEC 17, as well as other parts of the system. However, the system may be implemented in off the shelf systems.

Although the systems and methods described herein are shown in relation to WiFi signals, other types of radio frequency signals may be used. WiFi signals may have some advantages due to the high degree of granularity over short distances as compared to other types of commonly used RF signals, such as various mobile phone communications. Additionally, other types of signals such as ToF (Time of Flight) or PDP (Power Delay Profile) can be used in identifying the path intersection as well.

Various embodiments of systems and methods for Detection Of Motion And Magnetic-Based Landmarks may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form, such as, but not limited, to source code, compiled code, interpreted code, executable code, static code, dynamic code, and the like. Such a computer-readable medium may include any tangible non-transitory medium for storing information in a form readable by one or more computers, such as, but not limited to, read only memory (ROM); random access memory (RAM); magnetic disk storage media; optical storage media; a flash memory, etc.

Embodiments of systems and methods for Detection Of Motion And Magnetic-Based Landmarks described herein may be implemented in a variety of systems, including, but not limited to, smartphones, tablets, laptops, Ultrabooks™, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In one embodiment, a method of determining landmarks includes receiving, at a computing system, a plurality of potential landmark measurements and corresponding signal measurements. The method further includes determining, at the computing system, a plurality of landmark candidates from the plurality of potential landmark candidates and corresponding signal measurements. The method further includes determining a normalized signal distance between a first signal measurement corresponding to a first landmark candidate of the plurality of landmark candidates and a second signal measurement corresponding to a second landmark candidate of the plurality of landmark candidates. The method further includes determining, at the computing system, that the first landmark corresponds to the second landmark based on the normalized signal distance. Optionally, the determining of the plurality of landmark candidates from the plurality of potential landmark candidates is based on a magnetic field measurement of each of the plurality of landmark candidates and the landmark is a magnetic type landmark. Alternatively, if a magnetic field measurement of a potential landmark candidate of the plurality of potential landmark candidates is greater than a first threshold, then the potential landmark candidate is determined to be part of the plurality of landmark candidates. In one configuration, if a magnetic field measurement of a potential landmark candidate of the plurality of potential landmark candidates is greater than a first threshold and the potential landmark candidate is a local maximum for magnetic field measurement, then the potential landmark candidate is determined to be part of the plurality of landmark candidates. Optionally, the determining of the plurality of landmark candidates from the plurality of potential landmark candidates is based on turn information and the landmark is a turn type landmark. Alternatively, each of the plurality of potential landmark candidates includes information about a heading detected at a portable electronic device (PED). In one configuration, the determining includes determining turning points from heading directions. In another configuration, each of the plurality of potential landmark candidates that are determined to have an angular change above a first angular change threshold and determined to have a modal direction change that exceeds a second threshold are determined to be one of the plurality of landmark candidates. Optionally, the modal direction change is calculated by determining a modal direction difference over a window before and after each of the plurality of potential landmark candidates. Alternatively, the signal measurements are WiFi signals.

In one embodiment, a system for determining landmarks includes a computing system configured to receive a plurality of potential landmark measurements and corresponding signal measurements. The computing system is further configured to determine a plurality of landmark candidates from the plurality of potential landmark candidates and corresponding signal measurements. The computing system is further configured to determine a normalized signal distance between a first signal measurement corresponding to a first landmark candidate of the plurality of landmark candidates and a second signal measurement corresponding to a second landmark candidate of the plurality of landmark candidates. The computing system is further configured to determine that the first landmark corresponds to the second landmark based on the normalized signal distance. Optionally, the computing system determines the plurality of landmark candidates from the plurality of potential landmark candidates based on a magnetic field measurement of each of the plurality of potential landmark candidates and the landmark is a magnetic type landmark. In one configuration, if a magnetic field measurement of a potential landmark candidate of the plurality of potential landmark candidates is greater than a first threshold, then the potential landmark candidate is determined to be part of the plurality of landmark candidates. In another configuration, if a magnetic field measurement of a potential landmark candidate of the plurality of potential landmark candidates is greater than a first threshold and the potential landmark candidate is a local maximum for magnetic field measurement, then the potential landmark candidate is determined to be part of the plurality of landmark candidates. Optionally, the computing system determines the plurality of landmark candidates from the plurality of potential landmark candidates based on turn information and the landmark is a turn type landmark. Alternatively, each of the plurality of potential landmark candidates include information about a heading detected at the PED. In one alternative, the computing system further determines the plurality of landmark candidates from the plurality of potential landmark candidates based on determining turning points from heading directions. In another alternative, each of the plurality of potential landmark candidates that are determined to have an angular change above a first angular change threshold and determined to have a modal direction change that exceeds a second threshold are determined to be one of the plurality of landmark candidates. Optionally, the modal direction change is calculated by determining a modal direction difference over a window before and after each of the plurality of landmark candidates. Alternatively, the signal measurements are WiFi signals. Optionally, the computing system includes a gyroscopic sensor and an accelerometer the turn information is based on data from the gyroscopic sensor and the accelerometer. Alternatively, the computing system includes a magnetometer and the magnetometer is configured to generate the magnetic field measurement of each of the plurality of landmark candidates. Optionally, the computing system includes a WiFi module that is configured to create the signal scan measurements for the plurality of potential landmark measurements.

In one embodiment, a computer-readable non-transitory storage medium contains instructions, which when executed by one or more processors, result in performing operations including receiving a plurality of potential landmark measurements and corresponding signal measurements. The instructions further include determining a plurality of landmark candidates from the plurality of potential landmark candidates and corresponding signal measurements. The instructions further include determining a normalized signal distance between a first signal measurement corresponding to a first landmark candidate of the plurality of landmark candidates and a second signal measurement corresponding to a second landmark candidate of the plurality of landmark candidates. The instructions further include determining that the first landmark corresponds to the second landmark based on the normalized signal distance. In one configuration, the determining of the plurality of landmark candidates from the plurality of potential landmark candidates is based on magnetic field measurement of each of the plurality of landmark candidates and the landmark is a magnetic type landmark. In another configuration, a magnetic field measurement of a potential landmark candidate of the plurality of potential landmark candidates is greater than a first threshold, and responsively the potential landmark candidate is determined to be part of the plurality of landmark candidates. The instructions further include a magnetic field measurement of a potential landmark candidate of the plurality of potential landmark candidates that is greater than a first threshold and the potential landmark candidate is a local maximum for magnetic field measurement, then the potential landmark candidate is determined to be part of the plurality of landmark candidates. Optionally, the instructions further include that the determining of the plurality of landmark candidates from the plurality of potential landmark candidates is based on turn information and the landmark is a turn type landmark. Optionally, the instructions further include that each of the plurality of potential landmark candidates includes information about a heading detected at the PED. Optionally, the instructions further include that the determining includes determining turning points from heading directions. Optionally, the instructions further include that each of the plurality of potential landmark candidates that are determined to have an angular change above a first angular change threshold and determined to have a modal direction change that exceeds a second threshold are determined to be one of the plurality of landmark candidates. Optionally, the instructions further include that the modal direction change is calculated by determining a modal direction difference over a window before and after each of the plurality of potential landmark candidates. Optionally, the instructions further include that the signal measurements are WiFi signals.

The previous detailed description is of a small number of embodiments for implementing the systems and methods for Detection Of Motion And Magnetic-Based Landmarks and is not intended to be limiting in scope. The following claims set forth a number of the embodiments of the systems and methods for Detection Of Motion And Magnetic-Based Landmarks disclosed with greater particularity.

The invention claimed is:

1. A method of determining landmarks, the method comprising:
   receiving, at a computing system, a plurality of potential landmark measurements and corresponding signal measurements;
   determining, at the computing system, a plurality of landmark candidates from the plurality of potential landmark candidates and corresponding signal measurements;
   determining, at the computing system, a normalized signal distance between a first signal measurement corresponding to a first landmark candidate of the plurality of landmark candidates and a second signal measurement corresponding to a second landmark candidate of the plurality of landmark candidates; and
   determining, at the computing system, that the first landmark corresponds to the second landmark based on the normalized signal distance.

2. The method of claim 1, wherein the determining of the plurality of landmark candidates from the plurality of potential landmark candidates is based on a magnetic field measurement of each of the plurality of landmark candidates and the landmark is a magnetic type landmark.

3. The method of claim 2, wherein a magnetic field measurement of a potential landmark candidate of the plurality of potential landmark candidates is greater than a first threshold and responsively the potential landmark candidate is determined to be part of the plurality of landmark candidates.

4. The method of claim 2, wherein a magnetic field measurement of a potential landmark candidate of the plurality of potential landmark candidates is greater than a first threshold and the potential landmark candidate is a local maximum for magnetic field measurement and responsively the potential landmark candidate is determined to be part of the plurality of landmark candidates.

5. The method of claim 1, wherein the determining of the plurality of landmark candidates from the plurality of potential landmark candidates is based on turn information and the landmark is a turn type landmark.

6. The method of claim 5, wherein each of the plurality of potential landmark candidates includes information about a heading detected.

7. The method of claim 5, wherein the determining includes determining turning points from heading directions.

8. The method of claim 7, wherein each of the plurality of potential landmark candidates that are determined to have an angular change above a first angular change threshold and determined to have a modal direction change that exceeds a second threshold are determined to be one of the plurality of landmark candidates.

9. The method of claim 7, wherein the modal direction change is calculated by determining a modal direction difference over a window before and after each of the plurality of potential landmark candidates.

10. The method of claim 1, wherein the signal measurements are WiFi signals.

11. A system for determining landmarks, the system comprising:
    a computing system configured to
       receive a plurality of potential landmark measurements and corresponding signal measurements;
       determine a plurality of landmark candidates from the plurality of potential landmark candidates and corresponding signal measurements;
       determine a normalized signal distance between a first signal measurement corresponding to a first landmark candidate of the plurality of landmark candidates and a second signal measurement corresponding to a second landmark candidate of the plurality of landmark candidates; and
       determine that the first landmark corresponds to the second landmark based on the normalized signal distance.

12. The system of claim 11, wherein the computing system determines the plurality of landmark candidates from the plurality of potential landmark candidates based on a magnetic field measurement of each of the plurality of landmark candidates and the landmark is a magnetic type landmark.

13. The system of claim 12, wherein a magnetic field measurement of a potential landmark candidate of the plurality of potential landmark candidates is greater than a first threshold and responsively the potential landmark candidate is determined to be part of the plurality of landmark candidates.

14. The system of claim 12, wherein a magnetic field measurement of a potential landmark candidate of the plurality of potential landmark candidates is greater than a first threshold and the potential landmark candidate is a local maximum for magnetic field measurement and responsively the potential landmark candidate is determined to be part of the plurality of landmark candidates.

15. The system of claim 12, wherein the computing system includes a magnetometer and the magnetometer is configured to generate the magnetic field measurement of each of the plurality of landmark candidates.

16. The system of claim 11, wherein the computing system includes a WiFi module that is configured to create the signal scan measurements for the plurality of potential landmark measurements.

17. The system of claim 11, wherein the computing system determines the plurality of landmark candidates from the plurality of potential landmark candidates based on turn information and the landmark is a turn type landmark.

18. The system of claim 17, wherein each of the plurality of potential landmark candidates includes information about a heading detected.

19. The system of claim 17, wherein the computing system includes a gyroscopic sensor and an accelerometer and the turn information is based on data from the gyroscopic sensor and the accelerometer.

20. The system of claim 11, wherein the computing system is implemented in a computing device selected from the list consisting of a smart phone, a tablet, a laptop, a server, a smart phone and a server, a cloud computing system, and combinations thereof.

21. A computer-readable non-transitory storage medium that contains instructions, which when executed by one or more processors, result in performing operations comprising:
receiving a plurality of potential landmark measurements and corresponding signal measurements;
determining a plurality of landmark candidates from the plurality of potential landmark candidates and corresponding signal measurements;
determining a normalized signal distance between a first signal measurement corresponding to a first landmark candidate of the plurality of landmark candidates and a second signal measurement corresponding to a second landmark candidate of the plurality of landmark candidates; and
determining that the first landmark corresponds to the second landmark based on the normalized signal distance.

22. The medium of claim 21, wherein the determining of the plurality of landmark candidates from the plurality of potential landmark candidates is based on a magnetic field measurement of each of the plurality of landmark candidates and the landmark is a magnetic type landmark.

23. The medium of claim 22, wherein the instructions further include that a magnetic field measurement of a potential landmark candidate of the plurality of potential landmark candidates is greater than a first threshold and responsively the potential landmark candidate is determined to be part of the plurality of landmark candidates.

24. The medium of claim 23, wherein a magnetic field measurement of a potential landmark candidate of the plurality of potential landmark candidates is greater than a first threshold and the potential landmark candidate is a local maximum for magnetic field measurement and responsively the potential landmark candidate is determined to be part of the plurality of landmark candidates.

25. The medium of claim 24, wherein the determining of the plurality of landmark candidates from the plurality of potential landmark candidates is based on turn information and the landmark is a turn type landmark.

* * * * *